United States Patent

[11] 3,631,478

| [72] | Inventor | Joseph T. McNaney<br>8548 Boulder Drive, La Mesa, Calif. 92041 |
|------|----------|---|
| [21] | Appl. No. | 74,624 |
| [22] | Filed | Sept. 23, 1970 |
| [45] | Patented | Dec. 28, 1971 |

[54] LIGHT GUIDE SUPPORT MEANS AND DISPLAY DEVICE UTILIZING SAME
5 Claims, 7 Drawing Figs.

[52] U.S. Cl............................................ 340/380,
340/336, 350/96 R
[51] Int. Cl............................................ G08b 5/36
[50] Field of Search............................................ 340/380;
350/96 R, 96 B; 240/1 EL; 250/227

[56] References Cited
UNITED STATES PATENTS

| 3,420,949 | 1/1969 | McNaney | 340/380 X |
| 3,439,578 | 4/1969 | McCallum | 350/96 BX |
| 3,509,561 | 4/1970 | Moore et al. | 340/380 |
| 3,562,746 | 2/1971 | Aron | 340/380 |

*Primary Examiner*—John W. Caldwell
*Assistant Examiner*—David L. Trafton

ABSTRACT: A display device includes the use of an assembly of preformed parts each designed to support an array of light guides wherein each array, when illuminated with light, will present a predetermined segment of one, or a number of different, informational characters.

Patented Dec. 28, 1971

3,631,478

INVENTOR.

Joseph P. McHaney

LIGHT GUIDE SUPPORT MEANS AND DISPLAY DEVICE UTILIZING SAME

BACKGROUND OF THE INVENTION

The present invention relates to informational character display devices of the type utilizing individually illuminated light-emitting ends of light-conducting material, such as light pipes, or, light guides, wherein the light-emitting ends are arranged so as to represent a group of segments with which letters, numerals, symbols, etc., may be formed.

However, presently known devices to which this invention relates, particularly known means by which they are fabricated, do not lend themselves to applications wherein the illuminating means thereof is required to be many inches, or many feet, distant from the display surface of the device.

SUMMARY OF THE INVENTION

The invention includes the use of an assembly of parts containing a predetermined array of sockets that have been formed therein for receiving quite readily and supporting the light guides of the device. Each of the parts are made of a plastic material and the forming thereof to meet the objectives of this invention is accomplished by relatively inexpensive extrusion techniques. An assembly of parts, therefore, will consist of a predetermined number of preformed strips of plastic, each having a particular cross section and each having supported therein a predetermined array of light guides. When assembled, the individual strips and the light guides supported therein along the longitudinal dimension thereof can provide a relatively long informational character forming device. At a light-emitting end of such a device segmentally arranged groups of the light-emitting ends of the light guides will be used to display informational characters and at the opposite end of the device the light-admitting ends of the light guides will be exposed to a source of illumination.

It is therefore an object of this invention to provide a device of the type herein described utilizing light guide support means which lend themselves to fabricating such units having a relatively large separation between the display surface and a source of illumination associated therewith.

There are other objects of the invention, of course, that will best be understood from the following description when read in view of the drawing hereof.

BRIEF DESCRIPTION OF THE DRAWING

Referring now to FIGS. 1 and 2, an assembly of parts is exemplified as having supported therein a plurality of light guides. In FIG. 1 these light guides have been identified as being in an orderly array of groups 1, 2, 3, 4, 5, 6 and 7, each group containing but four light guides which will hereinafter be referred to as informational character forming segments. The support means for the light guides include an assembly of parts having first and second end surfaces 11 and 12. Light guide groups 1 and 2 are supported in a part 13, group 3 is supported in part 14, group 4 is supported in part 15, group 5 is supported in part 16, and groups 6 and 7 are supported in part 17. As illustrated in the sectional view FIG. 2, each of these groups of light guides, as indicated by the showing of groups 1 and 2, extend from the first end surface 11 to the second end surface 12 of the assembly 10.

Figure 1:
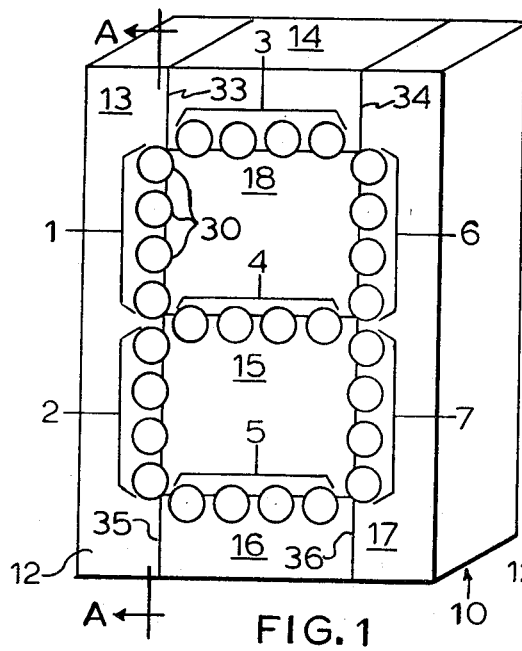
FIG. 1 shows an embodiment of the invention wherein a segmentally arranged grouping of the light guides is exemplified.

The various parts of the invention illustrated in the drawing are all shown somewhat oversize for the purpose of simplifying the description of the embodiments. The light guides, which may be of a plastic material, or of glass, can vary from a few thousandths of an inch in diameter on upward to larger fractions of an inch, and the length 20 in FIG. 2 can be but a few inches in length to many feet in length. The ability to fabricate assemblies having a dimension 20 of considerable length is inherent in the fact that all of the parts therein are formed by extrusion.

Figure 5:
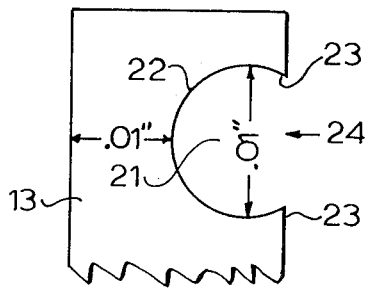
FIG. 5 represents a detail and exemplification of a light guide socket and shoulderlike projections that may be used in the FIG. 1 embodiment.

Dies through which the material of the parts 13 through 17 have been extruded are designed to provide a socket therein for supporting an individual light guide, each socket being of a size and shape to receive a particular light guide and to hold it securely therein. FIG. 5, for example, shows a cross section of a socket capable of meeting the requirements of this invention. The light guide will be placed in the space 21 of the socket 22 and held therein by shoulderlike projections 23 of the part 13. Sockets having other cross-sectional shapes, and having but one shoulderlike projection at the way of entry 24, can of course be provided in meeting the objectives of this invention. The material of each of the parts in which the sockets have been formed can be of plastic, such as Lucite, or other suitable materials having a degree of flexibility that will permit the dimension of the way of entry 24 between the projections 23 to be less than the cross-sectional dimension of the light guide to be placed in the socket 22. Although the particular shape of the projections 23 results in the total space 21 beyond the plane of entry from being a complete circle such shape is not to be limited in this regard. However, when the light guide is one having a circular cross section and to be supported in the socket of FIG. 5, and of those illustrated in FIG. 1, each opposing part, such a part 18 adjacent part 13, can be provided with surface formations 30 so as to adequately meet the space requirements of the light guide being supported in the assembly of parts.

Figure 6:
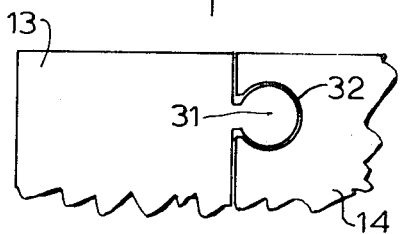
FIG. 6 is a detail of a locking means by which the various parts of the assembly in the FIG. 1 embodiment may be supported and held together as a unit.

When parts 13 through 17 each have the required number of light guides placed in their respective sockets the various parts are then assembled as indicated, for example, in FIG. 1. The parts may be held together in a secure position by a cement means, or by means of a key 31 and keyway 32 as illustrated in FIG. 6. This latter means will be taken care of in the extrusion process and thereby included in the adjoining surfaces 33, 34, 35 and 36, respectively, of the assembly 10.

Figure 2:
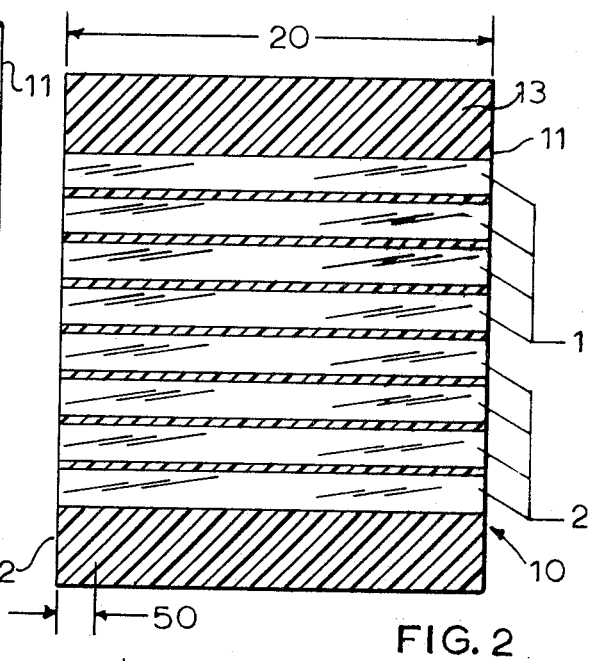
FIG. 2 shows a section through A—A of FIG. 1.
Figure 3:
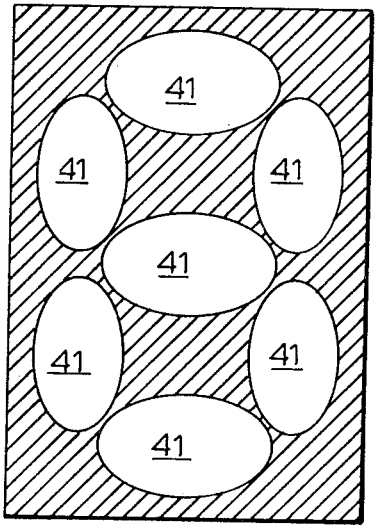
FIG. 3 is a partial showing of a light source housing embodiment of the invention and a section through B—B of FIG. 4.
Figure 4:
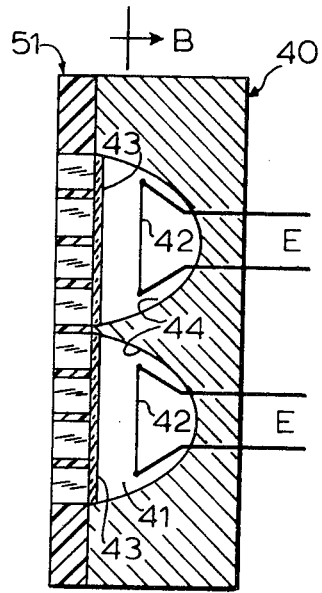
FIG. 4 shows a cross-sectional view of a display device embodiment of the invention.

Utilization of the embodiment of FIGS. 1 and 2 in an informational character display device will include the use of a source of light adjacent the light-admitting ends of the light guides. In FIG. 4 an embodiment of the invention illustrates the use of a light source housing 40 which contains a number of cavities 41, equal to the number of light guide segments 1 through 7 included in the assembly 10. Within each of the cavities there is a filament of tungsten, for example, which can be brought to a high degree of incandescence upon the application of a voltage E to a pair of leads connected to opposite ends of the filament 42. The filaments are therefore within a vacuum-sealed cavity 41, each having a light transparent window 43. The housing 40 may be made of an opaque material including light-reflective surfaces 44 designed to reflect light from a filament toward the ends of the light guides adjacent the open end of the cavity associated therewith. In order to exemplify that an assembly 10 may also be useful when a dimension 20 is divided into a number of smaller dimensions 50, 0.1 inch for example, such a portion 51 is supported adjacent the housing 40 in this embodiment of the invention. In any such event, or, independent of the length requirements of the assembly 10, each group of light guides 1 through 7 will have light-admitting ends supported within an area of the surface next to the housing 40 that is at least equal to the size opening of the cavity from which they are to receive light. Or, in other words, the size and shape of, and position of, each cavity will be designed to limit the light therefrom to the light-admitting ends of a predetermined group of light guides.

Although the light source in the embodiment of FIG. 4 has been described as containing vacuum-sealed cavities each provided with a light-emitting filament, each of the cavities may be provided, instead, with an individual light bulb. Each cavity will then serve as a reflector and means of limiting the light from the bulb to an individual array of light guides. However, when limited to fabricating relatively small size display devices there are advantages in having the housing 40 an actual portion of the vacuum-sealed unit.

Figure 7:
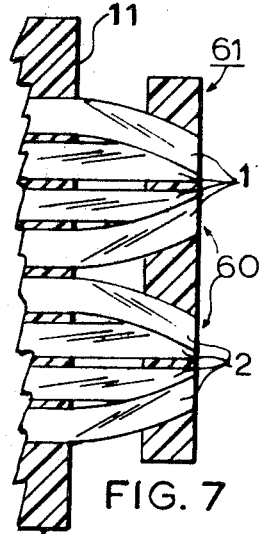
FIG. 7 illustrates an alternative means by which the light-admitting ends of light guides may be positioned and illuminated by a source of light adjacent thereto.

Referring now to FIG. 7, the light-admitting surface 11 of the assembly 10, is similar to the device described in connection with the illustrations of FIGS. 1 and 2, but different to the extent that the ends 60 of the light guides extend beyond the surface 11. Although only groups 1 and 2 are shown in FIG. 7, the device of this embodiment is to be understood as having groups 1 through 7 extended beyond the surface 11. In doing so, each group of light guides as the light-admitting ends thereof will be bundled together in a manner whereby they can be adapted more efficiently to receiving rays of light emanating from a point source of light. A lamp housing (not shown) containing such source of light for each of the seven groups of light guides will be supported closely adjacent the ends 60 and a member 61 having openings therein in which individual groups of light guides are bundled together.

The assembly of FIGS. 1 and 2, as well as other embodiments of the invention, have been described as containing seven informational character forming segments, but these descriptions are to be understood as being illustrative only in that devices containing 16 or more such segments can be included as well in the invention. The use of a greater number of segments will, of course, permit displays of a wider variety of characters. The light guides found to be very useful in this invention are, of course made of glass or plastic, and light guide material recommended is sold under the name of Crofon, a product of E. I. du Pont de Nemours & Company. This light guide material is available as small as 0.010 inch in diameter and by means of a series of sockets 22 formed on 0.020-inch center-to-center spacings, and supported on a material thickness dimension of 0.010 inch as indicated in FIG. 5, a 10-by-10 array of 0.010 inch light guides can be inexpensively supported in a 0.2×0.2-inch area. Moreover, this light guide support means will provide such arrays in substantial lengths.

I wish it also to be understood that the particular assemblies of light guide supporting parts and uses explained in connection therewith is illustrative only, and that the invention includes such other information character display arrangements thereof as well as such other modifications and equivalents as may be seen by those skilled in the arts, but still within the scope of the appended claims.

I claim:
1. An informational character display device comprising:
   a. a plurality of light guides each having a predetermined cross-sectional dimension, a longitudinal dimension, and first and second ends;
   b. light guide support means having formed therein a plurality of sockets each having a length extending from a first surface to a second surface of said support means and each said socket having one of said light guides supported therein along said longitudinal dimension;
   c. each said socket having a way of entry, extending from said first to said second surfaces, through which said light guide supported therein has been inserted; and
   d. each said socket having a shoulderlike projection of flexible material partially blocking said way of entry along said length to an extent of providing an entry dimension which is less than said cross-sectional dimension, the flexibility of said material allowing said light guide to be inserted in said socket through said entry dimension, beyond said projection and thereupon supported in said socket along said longitudinal dimension by said projection.

2. The invention as set forth in claim 1 additionally including:
   e. the second ends of said light guides each coinciding with the second surface of said support means and arranged thereat so as to provide a plurality of individually positioned second ends of said light guides each representative of an informational character forming element.

3. The invention as set forth in claim 1 additionally including:
   e. said support means including a plurality of parts each presenting a surface having formed therein a predetermined array of said sockets having light guides supported therein: f. means for assembling said plurality of parts so as to provide an array of informational character forming segments each comprise of a predetermined number of said second ends of said light guides;
   g. said array representative of means for utilization in said device for displaying a variety of informational characters.

4. The invention as set forth in claim 3 additionally including:
   h. said first end of the light guides of each segment being adjacent said first surface of said support means;
   i. a plurality of individual light sources each having means for extending the influence of a voltage thereto; and
   j. an individual one of said light sources positioned, respectively, adjacent said first ends of the light guides of each segment.

5. The invention as set forth in claim 3 additionally including:
   h. said first ends of the light guides of each segment being coincident with said first surface of said support means;
   i. said first ends of the light guides of each segment positioned within an individual surface area of said first surface, each said area conforming to an area dimensional requirement of said first ends therein;
   j. a light source housing presenting a surface, a thickness dimension and a plurality of cavities each having an opening in said surface and extending therefrom into said thickness dimension, said surface being adjacent the first surface of said support means and each said cavity having a light source therein and said opening thereto conforming to said area dimensional requirement of said first ends so as to limit an exposure of light to the individual surface area and said first ends therein immediately adjacent the opening to said cavity.

* * * * *